United States Patent
Brill et al.

(10) Patent No.: US 7,364,528 B2
(45) Date of Patent: Apr. 29, 2008

(54) INVERTED PORTAL AXLE CONFIGURATION FOR A LOW FLOOR VEHICLE

(75) Inventors: Lawrence D. Brill, Westerville, OH (US); Corrado A. Conti, Novara (IT); Brian D. Hayes, Newark, OH (US); Steven E. Hunter, Lancaster, OH (US); Fabio Maineri, Milan (IT); Tomaz Dopico Varela, Shelby Township, MI (US)

(73) Assignee: ArvinMeritor Technology, LLC, Troy, MI (US)

(*) Notice: Subject to any disclaimer, the term of this patent is extended or adjusted under 35 U.S.C. 154(b) by 217 days.

(21) Appl. No.: 10/555,421

(22) PCT Filed: May 2, 2003

(86) PCT No.: PCT/IT03/00270

§ 371 (c)(1),
(2), (4) Date: Oct. 21, 2005

(87) PCT Pub. No.: WO2004/096581

PCT Pub. Date: Nov. 11, 2004

(65) Prior Publication Data

US 2007/0068723 A1    Mar. 29, 2007

(51) Int. Cl.
*F16H 37/06* (2006.01)
*B60K 17/24* (2006.01)

(52) U.S. Cl. .................. 475/332; 180/378; 180/905

(58) Field of Classification Search ............. 475/221, 475/332; 180/344, 348, 378, 905–906
See application file for complete search history.

(56) References Cited

U.S. PATENT DOCUMENTS

| | | |
|---|---|---|
| 2,915,920 A | 12/1959 | Keese |
| 3,311,186 A | 3/1967 | Kamlukin |
| 3,434,364 A | 3/1969 | Keese |
| 5,699,869 A | 12/1997 | Fritzinger |
| 6,035,956 A | 3/2000 | Maurer |
| 6,193,007 B1 | 2/2001 | Lie |
| 6,755,093 B2 | 6/2004 | Bennett |
| 6,793,035 B2 * | 9/2004 | Bennett et al. ............. 180/358 |
| 6,843,746 B2 * | 1/2005 | Hayes et al. ............... 475/160 |
| 7,048,087 B2 * | 5/2006 | Brill ........................ 180/371 |
| 2003/0010561 A1 | 1/2003 | Bartel |
| 2004/0026157 A1 | 2/2004 | Varela |

FOREIGN PATENT DOCUMENTS

DE          577089          5/1933

(Continued)

OTHER PUBLICATIONS

PCT Srch Report, Nov. 25, 2003.

*Primary Examiner*—Tisha Lewis
(74) *Attorney, Agent, or Firm*—Carlson, Gaskey & Olds

(57) ABSTRACT

An axle system includes an axle shaft offset located within an axle center beam housing. The axle shaft is located in a recess in a top wall of the axle center beam shaped with slopes to maximize clearance to the bottom of the vehicle floor panels. The pneumatic brake cylinders define a cylinder axis angled within an angular range from a generally vertical orientation for enhanced packaging.

19 Claims, 3 Drawing Sheets

FOREIGN PATENT DOCUMENTS

| | | |
|---|---|---|
| DE | 1660787 | 7/1953 |
| EP | 0 456 096 A1 | 11/1991 |
| EP | 000552446 A1 | 7/1993 |
| EP | 0 599 293 A1 | 6/1994 |
| EP | 0877672 | 11/1998 |
| FR | 658212 | 1/1929 |
| FR | 697929 | 11/1930 |
| GB | 1165217 | 9/1969 |
| GB | 2 080 747 A | 2/1982 |
| WO | WO 02/087901 A1 | 11/2002 |

\* cited by examiner

INVERTED PORTAL AXLE CONFIGURATION FOR A LOW FLOOR VEHICLE

BACKGROUND OF THE INVENTION

The present invention relates to an inverted portal axle configuration which provides for a vehicle having a low floor.

Mass transit vehicles, such as trolley cars, buses, and the like typically have seats aligned at the lateral sides of the vehicle, with a central aisle and floor extending along the vehicle. In order to facilitate entering and exiting from the vehicle, it is desirable to have the vehicle floor and aisle positioned relatively low to the ground. This provides faster cycle time at bus stops.

Many such vehicles provide a rigid axle having a gear box at each longitudinal end to form an inverted portal axle configuration. The inverted portal axle configuration is particularly effective in providing a low floor vehicle.

In the inverted portal axles, the axle shafts are offset vertically relative to the wheel axis by a specific distance, the so-called axle shaft drop. That is, the axle shaft drop is the offset between the wheel axis and the axle shaft axis. This drop is limited by a side reduction gear system. Based on the existing twin idler gear concepts, this distance is approximately 140-150 mm.

Larger distances may be difficult to achieve due to the very large size of the idler gears, which would be expensive and difficult to package properly, due to wheel, brake, and suspension constraints. As result of this, an axle beam drop of approximately 110 mm has been achieved by conventional products. That is, the axle beam drop is the offset between the wheel axis and the top of the center housing. However, on an ultra low floor vehicle, this requires a ramp on the vehicle floor over the drive axle to allow the vehicle to meet the floor in the rest of the vehicle and at the doors. Slopes in the range of 8 to 12 degrees are typical but are considered excessive; therefore, a larger axle beam drop is desired.

Accordingly, it is desirable to provide an inverted portal axle configuration that provides for an ultra low flow profile while minimizing the ramp angle on the vehicle floor over the drive axle.

SUMMARY OF THE INVENTION

An inverted portal axle system according to the present invention includes an axle shaft offset located within an axle center beam housing. Each side reduction gear system housing includes a wheel hub assembly driven by a gear reducer which is preferably a double stage reduction gearbox providing the required speed reduction. The axle shaft is located in a recess in a top wall of the axle center beam which is preferably shaped with slopes to maximize clearance for the vehicle floor.

Disc brakes are integrated in the inverted portal axle system and are typically air operated by a pneumatic cylinder. The pneumatic cylinders are mounted to define a cylinder axis from a generally vertical orientation. The pneumatic cylinders can be rotated from a vertical orientation to allow for a more compact packaging of the brake actuator and suspension rod brackets.

The present invention therefore provides an inverted portal axle configuration which provides for an ultra low flow profile while minimizing the ramp angle on the vehicle floor over the drive axle.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1A:
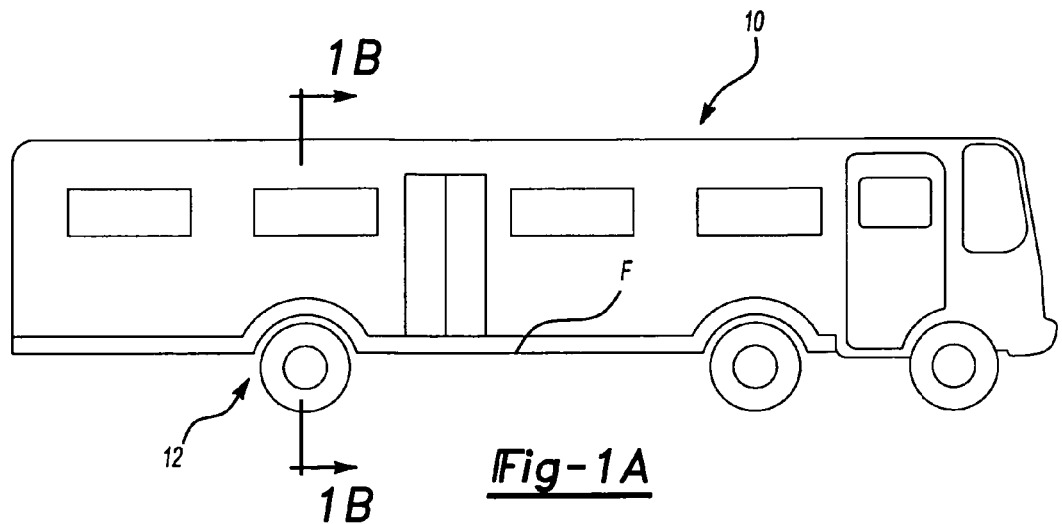
FIG. 1A is a schematic view of an inverted portal axle system designed according to the present invention.
Figure 1B:
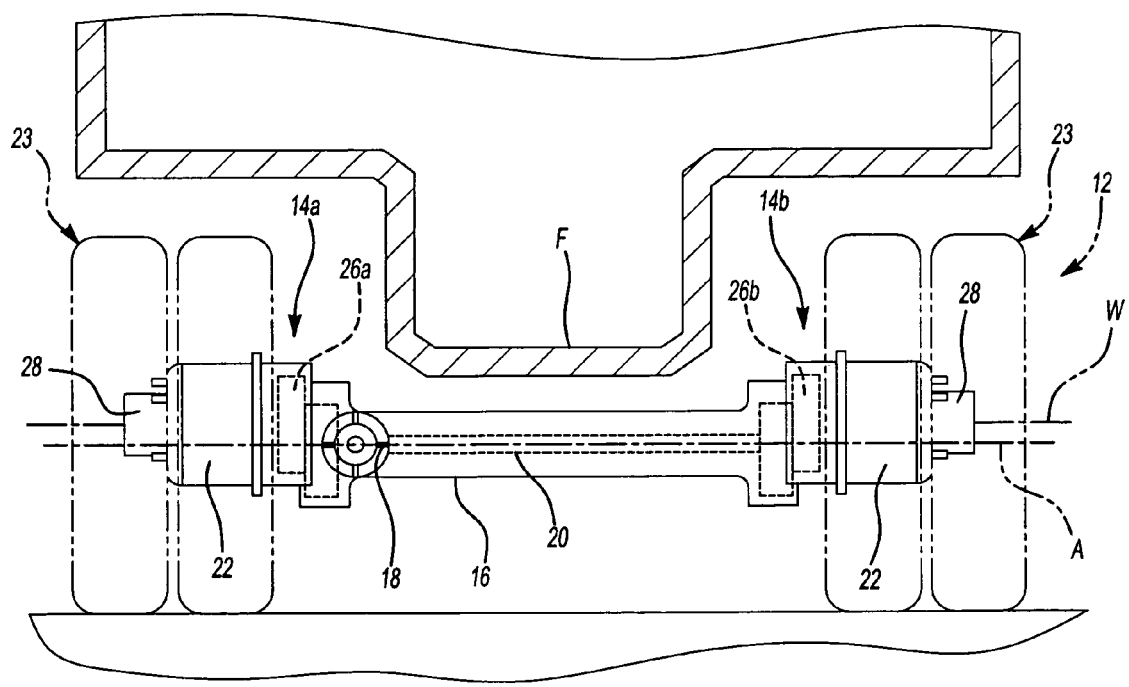
FIG. 1B is a rear view of an axle system taken above the line 1B-1B of FIG. 1A.

FIGS. 1A and 1B schematically illustrate a vehicle 10 incorporating an inverted portal axle system 12 adjacent a vehicle floor F. The inverted portal axle 12 includes a pair of side reduction gear system housings 14A, 14B interconnected by an axle center beam housing 16. An input 18 is positioned near one of the side reduction gear system housings 14A, 14B and a shaft assembly 20 connects the input 18 to the other side reduction gear system housings 14A, 14B. It should be understood that the shaft assembly 20 may include one or more axle segments. The shaft assembly 20 defines an axle axis of rotation A.

Each side reduction gear system housing 14A, 14B includes a wheel hub assembly 22 driven by a gear reduction (illustrated schematically at 26A, 26B) which is preferably a double stage reduction gearbox providing the required speed reduction. The gear reductions 26A, 26B drive spindles 28, which drives the wheel hub assembly 22 and tires 23 as shown in FIG. 1B. The gear reduction 26A, 26B includes gearing to transfer the torque from the shaft assembly 20 to the spindle 28 through the gear reduction 26A, 26B. The spindles 28 defines a wheel axis of rotation W. The wheel axis of rotation W is higher relative to the ground than the axle axis of rotation A. Tires 23 are mounted for rotation with the hub assemblies 22 as generally known.

Figure 2A:
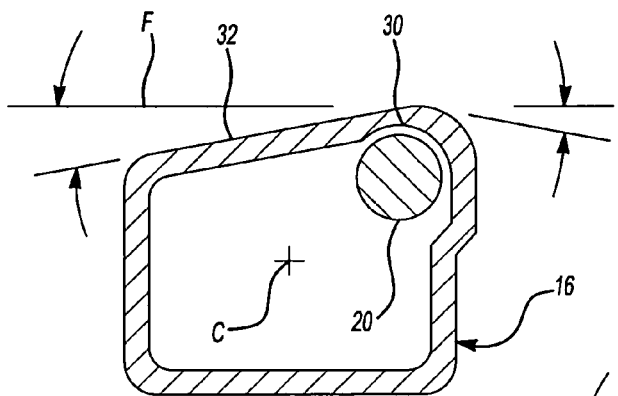
FIG. 2A is a schematic sectional view of a axle center beam housing according to the present invention.
Figure 2B:
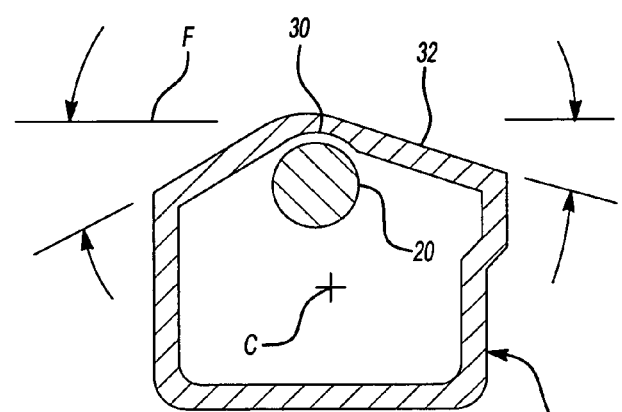
FIG. 2B is a schematic sectional view of another axle center beam housing according to the present invention.

Referring to FIG. 2A, the shaft assembly 20 is preferably offset located within the axle center beam housing 16. In other words, the shaft assembly 20 is offset from a centerline C in the vertical and/or in the longitudinal within the axle center beam housing 16. The shaft assembly 20 is preferably located in a recess 30 on the top wall 32 of the axle center beam housing 16. It should be understood that relative positional terms such as "top", "forward," "aft," "upper," "lower," "above," "below," and the like are with reference to the normal operational attitude of the vehicle and should not be considered otherwise limiting. The top wall 32 of the center beam housing 16 is preferably shaped with slopes to maximize clearance to the bottom of the floor panels F (FIG. 1A). The location of the recessed axle shaft can be anywhere longitudinally inside the axle center beam housing 16 (see one alternative position in FIG. 2B).

Figure 2C:
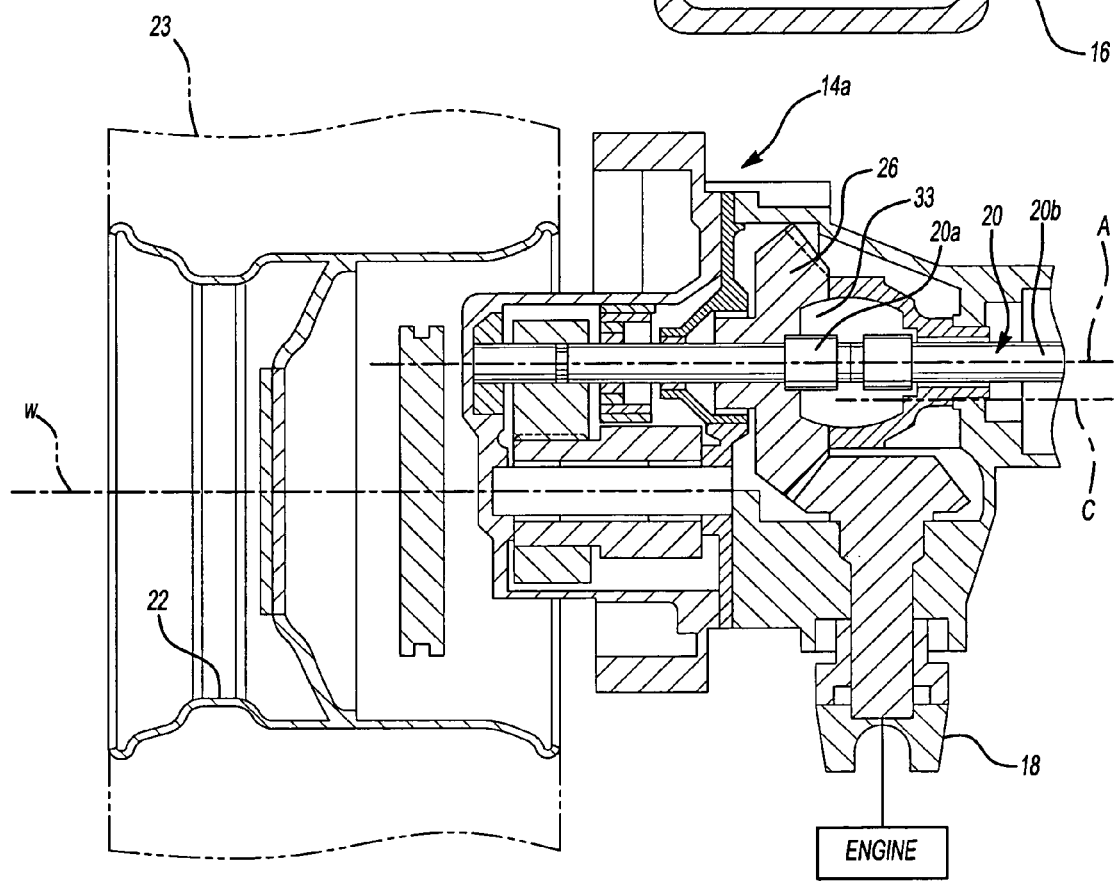
FIG. 2C is a top sectional view of a side reduction gear system housing.

Referring to FIG. 2C, the inverted portal axle system 12 includes a differential assembly (illustrated schematically at 33) which drives the shaft assembly 20. The shaft assembly 20 preferably includes a short half-shaft 20a (differential side) and a long half-shaft 20b (opposite differential side). It should be understood that the terms "long" and "short" are relative terms utilized for descriptive purposes and other shaft lengths, including equal length half-shafts, prop shafts and other rotating members, will benefit from the present invention. By offsetting the shaft assembly 20 from the centerline C, the differential centerline is positioned away from the transmission, thereby increasing the length of the drive shaft and minimizing the axle center beam housing 16.

Figure 3A:
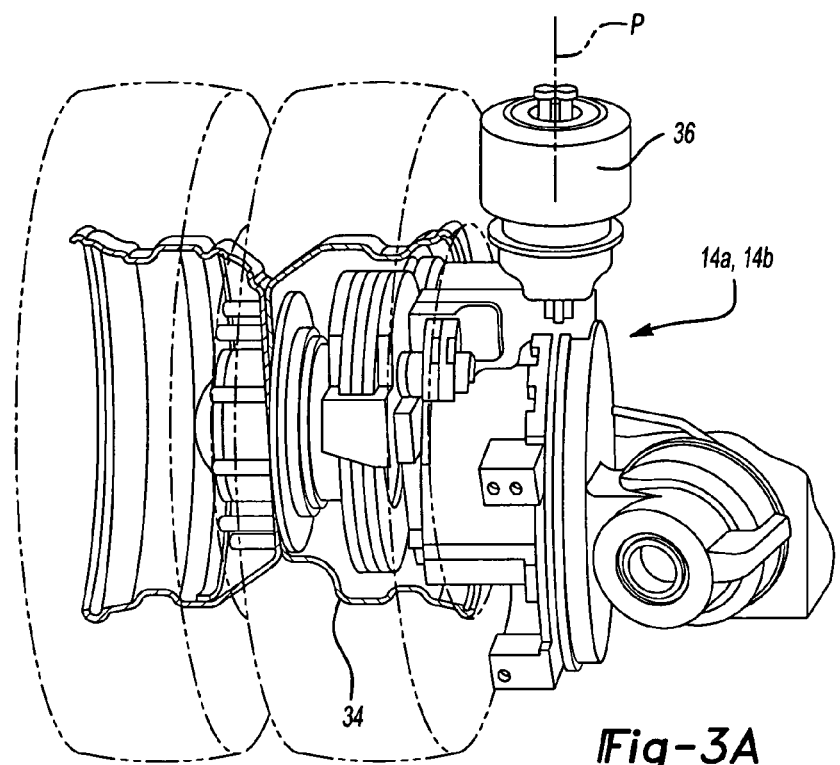
FIG. 3A is a partial sectional view of a side reduction gear system housing illustrating a pneumatic brake cylinder.
Figure 3B:
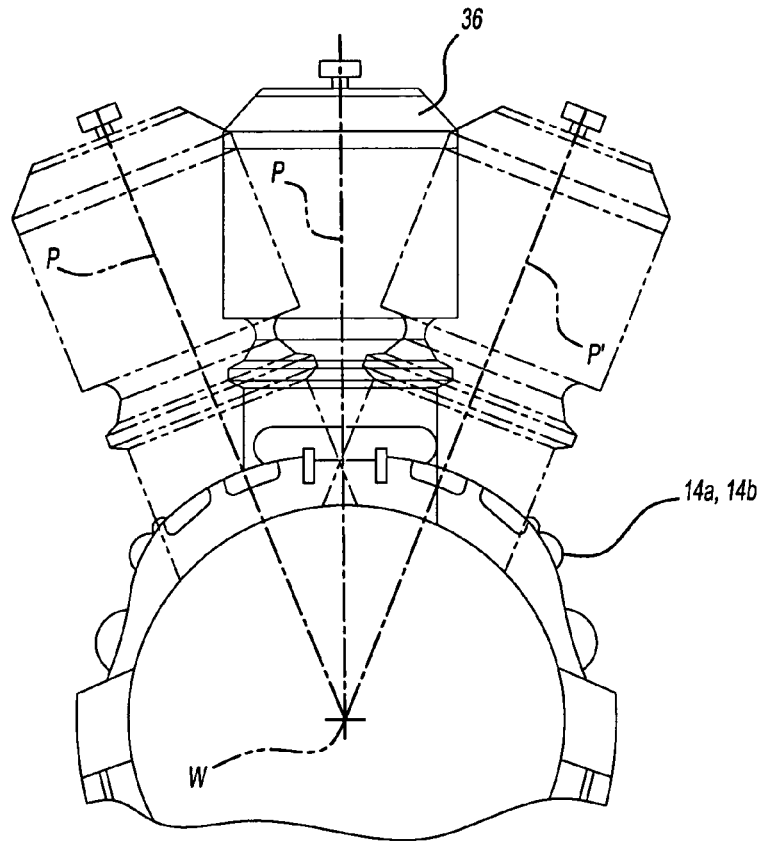
FIG. 3B is a side view of a side reduction gear system housing illustrating a rotated pneumatic brake cylinder.

Referring to FIG. 3A, each gear reduction 26A, 26B is braked by disc brakes 34. The disc brakes 34 are integrated in the inverted portal axle system 12 and are typically air operated by a pneumatic cylinder 36, via a shift lever or the like as is generally known. It should be understood that alternative types of actuation could also be used such as electromechanical, hydraulic, etc. The pneumatic brake cylinder 36 defines a cylinder axis P. Axis P is preferably angled within an angular range radially to the disc brake axis (FIG. 3B). The clocking of the cylinder 36 around the wheel axis of rotation W of the side reduction gear system housing 14A, 14B from a generally vertical orientation to approximately 45 degrees with the vertical allows the inverted portal axle system 12 to provide less interference with the vehicle floor and thus a lower floor profile. The radially rotated brake cylinder 36 allows for better packaging of brake actuator, and suspension rod brackets.

The combination of features of the present invention provides an inverted portal axle with capability of center beam drop of up to 150-160 mm, which allows the vehicle floor F over the axle to be reduced by 40-50 mm, which can provide a full flat floor or only a minor slope over the axle.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

The invention claimed is:

1. An inverted portal axle assembly comprising:
an axle shaft assembly defining an axle axis of rotation;
a first gear reduction driving a first spindle about a wheel axis of rotation spaced apart from said axle axis of rotation;
a second gear reduction driving a second spindle about said wheel axis of rotation, said first and second gear reductions being driven by said axle shaft assembly; and
an axle housing extending between said first and second gear reductions and defining a housing centerline longitudinally and vertically offset from said axle axis of rotation, said axle housing defining an inner cavity that receives said axle shaft assembly, and wherein said axle axis of rotation is positioned vertically between said housing centerline and said wheel axis of rotation.

2. The inverted portal axle assembly according to claim 1 wherein said axle housing includes a housing wall wit a recess, said axle shaft assembly being located within said recess.

3. The inverted portal axle assembly according to claim 2 wherein said housing wall comprises a top wall of said axle housing and wherein said recess is defined by a surface that is non-symmetrical about said housing centerline.

4. The inverted portal axle assembly according to claim 1 wherein said axle housing includes a top wall that is adapted to be sloped relative to a horizontal plane defined by a vehicle floor.

5. The inverted portal axle assembly according to claim 1 including a first pneumatic brake cylinder attached to said first gear reduction and a second pneumatic brake cylinder attached to said second gear reduction, said first and said second pneumatic brake cylinders each defining a cylinder axis tat is radially offset from a vertical orientation.

6. The inverted portal axle assembly according to claim 5 wherein said first and said second pneumatic brake cylinders are rotatable within an angular range about said wheel axis of rotation.

7. The inverted portal axle assembly according to claim 6 wherein said cylinder axis for each of said first and second pneumatic brake cylinders is orientated at forty-five degrees relative to said wheel axis of rotation.

8. The inverted portal axle assembly according to claim 1 including a differential coupled to an input, said differential being positioned laterally closer to one of said first and said second gear reductions than the other of said first and said second gear reductions, and wherein said differential drives said axle shaft assembly.

9. An inverted portal axle assembly comprising:
a differential driven by an input;
an axle shaft assembly driven by said differential about an axle axis of rotation;
a first gear reduction driving a first spindle about a wheel axis of rotation spaced apart from said axle axis of rotation;
a second gear reduction driving a second spindle about said wheel axis of rotation; and
an axle housing extending between said first and said second gear reductions and defining a housing centerline longitudinally and vertically offset from said axle axis of rotation, said axle housing having a housing wall with a recess that receives said axle shaft assembly, and wherein said axle axis of rotation is positioned vertically between said housing centerline and said wheel axis of rotation.

10. The inverted portal axle assembly according to claim 9 wherein said wheel axis of rotation is vertically higher relative to ground than said axle axis of rotation and wherein said axle axis of rotation is vertically higher relative to ground than said housing centerline.

11. The inverted portal axle assembly according to claim 10 wherein said input is adapted to receive input from an engine and wherein said axle axis of rotation is positioned on one side of said housing centerline and the engine is positioned on an opposite side of said housing centerline from said axle axis of rotation.

12. The inverted portal axle assembly according to claim 9 including a first pneumatic brake cylinder attached to said first gear reduction and a second pneumatic brake cylinder attached to said second gear reduction, said first and said second pneumatic brake cylinders each defining a cylinder axis that is radially offset from a vertical orientation.

13. The inverted portal axle assembly according to claim 12 wherein said first and said second pneumatic brake cylinders are rotatable within an angular range about said wheel axis of rotation.

14. The inverted portal axle assembly according to claim 9 wherein said housing wall comprises a top wall that cooperates with a bottom wall and side walls to define an inner cavity.

15. The inverted portal axle assembly according to claim 14 wherein said top wall is defined by a top surface that is obliquely orientated to said side walls.

16. The inverted portal axle assembly according to claim 9 wherein said first and said second gear reductions each comprise a double stage reduction gearbox.

17. The inverted portal axle assembly according to claim 9 wherein said axle shaft assembly comprises at least a first shaft and a second shaft that is longer than said first shaft, said first gear reduction being driven by one of said first and said second shafts, and said second gear reduction being driven by the other of said first and second shafts.

18. The inverted portal axle assembly according to claim 1 wherein said axle shaft assembly extends in a lateral direction.

19. The inverted portal axle assembly according to claim 9 wherein said axle shaft assembly extends in a lateral direction.

* * * * *

UNITED STATES PATENT AND TRADEMARK OFFICE
CERTIFICATE OF CORRECTION

| | |
|---|---|
| PATENT NO. | : 7,364,528 B2 |
| APPLICATION NO. | : 10/555421 |
| DATED | : April 29, 2008 |
| INVENTOR(S) | : Brill et al. |

Page 1 of 1

It is certified that error appears in the above-identified patent and that said Letters Patent is hereby corrected as shown below:

Claim 12, Column 3, line 65: "wit" should read as --with--

Claim 5, Column 4, line 14: "tat" should read as --that--

Signed and Sealed this

Nineteenth Day of August, 2008

JON W. DUDAS
*Director of the United States Patent and Trademark Office*